United States Patent
Huang et al.

(10) Patent No.: US 10,623,336 B2
(45) Date of Patent: Apr. 14, 2020

(54) METHOD FOR TRANSMITTING MBMS GROUP SERVICE DATA, BASE STATION, AND USER EQUIPMENT

(71) Applicant: HUAWEI TECHNOLOGIES CO., LTD., Shenzhen (CN)

(72) Inventors: Qufang Huang, Shanghai (CN);
Qinghai Zeng, Shanghai (CN);
Mingzeng Dai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 15/438,280

(22) Filed: Feb. 21, 2017

(65) Prior Publication Data
US 2017/0163568 A1 Jun. 8, 2017

Related U.S. Application Data

(63) Continuation of application No. PCT/CN2014/085013, filed on Aug. 22, 2014.

(51) Int. Cl.
*H04L 12/931* (2013.01)
*H04W 4/06* (2009.01)
(Continued)

(52) U.S. Cl.
CPC ........ *H04L 49/201* (2013.01); *H04L 61/6022* (2013.01); *H04L 67/303* (2013.01);
(Continued)

(58) Field of Classification Search
CPC . H04L 49/201; H04L 67/303; H04L 61/6022; H04W 4/06; H04W 88/08; H04W 88/02
See application file for complete search history.

(56) References Cited

U.S. PATENT DOCUMENTS 8,797,939 B2  8/2014 Al
2005/0286483 A1* 12/2005 Lee .................. H04W 72/005
370/345
(Continued)

FOREIGN PATENT DOCUMENTS

CN   101998242 A   3/2011
CN   101998274 A   3/2011
(Continued)

OTHER PUBLICATIONS

International Search Report dated May 25, 2015 in corresponding International Application No. PCT/CN2014/085013.
(Continued)

*Primary Examiner* — Ivan O Latorre
(74) *Attorney, Agent, or Firm* — Staas & Halsey LLP

(57) ABSTRACT

According to a method for transmitting MBMS group service data, a base station sends group service data to the UE within one MSP on an MBSFN subframe corresponding to an MCH; when the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH; and the base station instructs the UE to receive the remaining data on the one or more other subframes. The embodiments of the present invention are used for transmitting MBMS group service data.

17 Claims, 8 Drawing Sheets

---

S101 — A base station sends group service data to UE within one MSP on an MBSFN subframe corresponding to an MCH S102 — When the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH S103 — The base station instructs the UE to receive the remaining data on the other subframes

(51) Int. Cl.
*H04L 29/12* (2006.01)
*H04L 29/08* (2006.01)
*H04W 88/02* (2009.01)
*H04W 88/08* (2009.01)

(52) U.S. Cl.
CPC .............. *H04W 4/06* (2013.01); *H04W 88/02* (2013.01); *H04W 88/08* (2013.01)

(56) References Cited

U.S. PATENT DOCUMENTS

| | | | |
|---|---|---|---|
| 2010/0128649 A1* | 5/2010 | Gonsa | H04W 36/0007 370/312 |
| 2011/0080859 A1 | 4/2011 | Phan et al. | |
| 2011/0194428 A1* | 8/2011 | Wang | H04W 72/005 370/252 |
| 2012/0044826 A1 | 2/2012 | Wang et al. | |
| 2012/0140692 A1 | 6/2012 | Hu et al. | |
| 2012/0300689 A1 | 11/2012 | Lee et al. | |
| 2013/0055318 A1* | 2/2013 | Wang | H04W 72/005 725/62 |
| 2013/0294318 A1 | 11/2013 | Amerga et al. | |
| 2017/0019772 A1* | 1/2017 | Kim | H04W 4/06 |
| 2017/0245242 A1* | 8/2017 | Xu | H04W 72/005 |

FOREIGN PATENT DOCUMENTS

| | | |
|---|---|---|
| EP | 2434800 A1 | 3/2012 |
| EP | 2706677 A2 | 3/2014 |

OTHER PUBLICATIONS

Extended European Search Report dated Jul. 13, 2017 in corresponding European Patent Application No. 14900032.5.
"Change Request on forward compatibility support on possible group communication enhancements," 3GPP TSG-RAN WG2#86, Alcatel-Lucent, Current version: 12.1.0, May 19-23, 2014, R2-142651, 4 pgs.
Chinese Office Action dated Jun. 4, 2018, in corresponding Chinese Patent Application No. 201480026716.7, 5 pgs.
International Search Report dated May 25, 2015 in corresponding International Patent Application No. PCT/CN2014/085013.

* cited by examiner

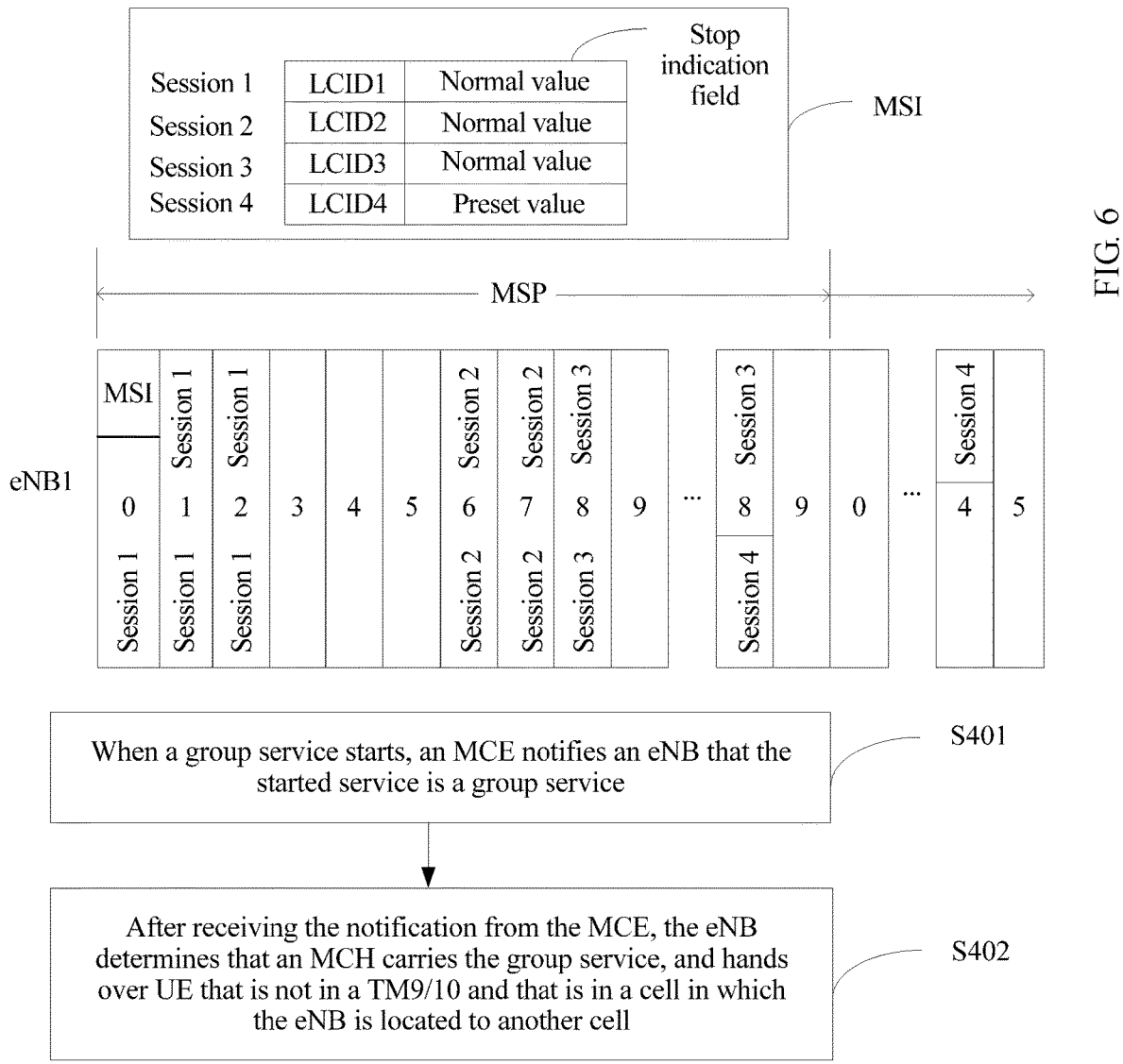

METHOD FOR TRANSMITTING MBMS GROUP SERVICE DATA, BASE STATION, AND USER EQUIPMENT

CROSS-REFERENCE TO RELATED APPLICATIONS

This application is a continuation of International Application No. PCT/CN2014/085013, filed on Aug. 22, 2014, the disclosure of which is hereby incorporated by reference in its entirety.

TECHNICAL FIELD

Embodiments of the present invention relate to the communications field, and in particular, to a method for transmitting MBMS group service data, a base station, and user equipment.

BACKGROUND

In a long term evolution (LTE) system, a multimedia broadcast multicast service (MBMS) service is transmitted by using a multimedia broadcast multicast service single frequency network (MBSFN). The MBMS service is a point-to-multipoint service, such as a mobile television. During MBSFN service transmission, evolved NodeBs (eNB) of multiple cells within an MBSFN area are required to transmit same data at the same time. In this way, user equipment (UE) is not affected by inter-cell interference generated during data transmission of a neighboring cell, but benefits from superposition of signals from multiple cells. The UE receives signals from multiple eNBs and performs combination, so that a signal-to-noise ratio may be increased, thereby effectively improving transmission efficiency of an MBMS service.

A group service is introduced in 3rd generation partnership project (3GPP) Release 13, and it is determined that the Group service is supported in an MBMS manner. The Group service is remarkably characterized by a small average data amount but relatively strong burstiness. In this case, if an existing multicast channel (MCH) multiplexing manner is used, a probability of congestion is obviously increased. The congestion indicates that within a same scheduling period (MCH Scheduling Period, MSP), a data amount needing to be sent exceeds a data amount that can be carried on MBSFN subframe resources owned by an MCH within the MSP. If the congestion occurs, an eNB discovers that a part of packets cannot be sent within a corresponding scheduling period, and discards this part of packets. To resolve a packet loss problem caused when a Group service data burst occurs, in the prior art, more MBSFN subframes are pre-allocated to an MCH that carries the Group service, so that a larger amount of data can be accommodated. However, when no data burst occurs, a large quantity of MBSFN subframes allocated to the MCH are idle. Although the eNB may use the idle MBSFN subframes for scheduling UE in a transmission mode 9/10 (TM9/10), if a proportion of the UE in the TM9/10 in the total UEs is relatively low, the eNB cannot use the remaining MBSFN subframes. Consequently, a waste of radio resources is caused.

SUMMARY

Embodiments of the present invention provide a method for transmitting MBMS group service data, a base station, and user equipment, so as to efficiently utilize radio resources.

According to a first aspect, an embodiment of the present invention provides a method for transmitting MBMS group service data, where the method includes:

sending, by a base station, group service data to user equipment UE within one multicast channel scheduling period MSP on a multimedia broadcast multicast service single frequency network MBSFN subframe corresponding to a multicast channel MCH;

when the base station cannot completely send the group service data on the MBSFN subframe that is corresponding to the MCH and that is within the MSP, sending, by the base station, on one or more other subframes except the MBSFN subframe corresponding to the MCH, remaining group service data that cannot be sent on the MBSFN subframe corresponding to the MCH; and instructing, by the base station, the UE to receive the remaining data on the one or more other subframes.

With reference to the first aspect, in a first possible implementation manner, the instructing, by the base station, the UE to receive the remaining data on the one or more other subframes includes:

sending, by the base station, scheduling information that includes instruction information to the UE, where the instruction information is used to instruct the UE to receive the remaining data on the one or more other subframes.

With reference to the first possible implementation manner of the first aspect, in a second possible implementation manner, the scheduling information includes: multicast channel scheduling information (MSI) or a Media Access Control-control element (MAC-CE).

With reference to the first possible implementation manner of the first aspect, in a third possible implementation manner, the instructing, by the base station, the UE to receive the remaining data on the one or more other subframes further includes:

sending, by the base station, time instruction information to the UE, where the time instruction information is used to instruct the UE to receive, according to the instruction information, the remaining data within a preset time period.

With reference to the first, the second, or the third possible implementation manner of the first aspect, in a fourth possible implementation manner, the method further includes: sending, by the base station, a radio network temporary identifier (RNTI) used to identify the MCH to the UE, where the instruction information is used to instruct the UE to receive, according to the received RNTI, the remaining data on the one or more other subframes.

With reference to the first aspect, in a fifth possible implementation manner, the method further includes:

instructing, by the base station, the UE to obtain a logical channel identifier (LCID) carried in a Media Access Control protocol data unit (MAC PDU) in the packet, so as to determine, according to a correspondence between the LCID and the session, the session corresponding to the packet.

With reference to the fifth possible implementation manner of the first aspect, in a sixth possible implementation manner, the LCID is an LCID used when the base station sends the group service data by using the MBSFN subframe.

With reference to the first aspect, in a seventh possible implementation manner, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

With reference to the fourth possible implementation manner of the first aspect, in an eighth possible implementation manner, the sending, by the base station, a radio network temporary identifier RNTI used to identify the MCH to the UE includes:

allocating, by the base station, a corresponding RNTI to the MCH, and sending the allocated RNTI in a system information block (SIB) to the UE.

With reference to the fourth possible implementation manner of the first aspect, in a ninth possible implementation manner, the sending, by the base station, a radio network temporary identifier RNTI used to identify the MCH to the UE includes:

sending, by the base station by using a multicast control channel (MCCH), an RNTI that is of the MCH and that is determined by a multicast coordination entity MCE to the UE.

With reference to the ninth possible implementation manner of the first aspect, in a tenth possible implementation manner, the method further includes:

if the RNTI that is of the MCH and that is determined by the MCE is allocated by the base station to any UE accessing the base station and used as a cell radio network temporary identifier (C-RNTI) of the any UE, replacing, by the base station, the RNTI with a new RNTI for the any UE as the C-RNTI of the any UE.

With reference to the second possible implementation manner of the first aspect, in an eleventh possible implementation manner, the instruction information is a preset value of a stop identifier field in the MSI, and the preset value includes a reserve value.

According to a second aspect, an embodiment of the present invention provides a method for transmitting MBMS group service data, where the method includes:

when user equipment UE receives group service data sent, by a base station, on a multimedia broadcast multicast service single frequency network MBSFN subframe corresponding to a multicast channel MCH, receiving, by the UE, instruction information sent by the base station, where the instruction information is used to instruct the UE to receive, on one or more other subframes except the MBSFN subframe corresponding to the MCH, remaining group service data that cannot be sent on the MBSFN subframe corresponding to the MCH; and receiving, by the UE, the remaining data on the one or more other subframes according to the instruction information.

With reference to the second aspect, in a first possible implementation manner, the receiving, by the UE, instruction information sent by the base station includes:

receiving, by the UE, scheduling information that includes the instruction information and that is sent by the base station.

With reference to the first possible implementation manner of the second aspect, in a second possible implementation manner, the scheduling information includes: multicast channel scheduling information MSI or a Media Access Control-control element MAC-CE.

With reference to the second aspect, in a third possible implementation manner, the method further includes:

receiving, by the UE, time instruction information sent by the base station, where the time instruction information is used to instruct the UE to receive, according to the instruction information, the remaining data within a preset time period.

With reference to any one of the second aspect, or the first to the third possible implementation manners of the second aspect, in a fourth possible implementation manner, the method further includes:

receiving, by the UE, a radio network temporary identifier RNTI that is used to identify the MCH and that is sent by the base station, where the instruction information is used to instruct the UE to receive, according to the received RNTI, the remaining data on the one or more other subframes.

With reference to the second aspect, in a fifth possible implementation manner, the method further includes:

obtaining, by the UE, a logical channel identifier LCID carried in a Media Access Control protocol data unit MAC PDU in the packet, so as to determine, according to a correspondence between the LCID and the session, the session corresponding to the packet.

With reference to the fifth possible implementation manner of the second aspect, in a sixth possible implementation manner, the LCID is an LCID used when the base station sends the group service data by using the MBSFN subframe.

With reference to the second aspect, in a seventh possible implementation manner, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

With reference to the fourth possible implementation manner of the second aspect, in an eighth possible implementation manner, the receiving, by the UE, a radio network temporary identifier RNTI that is used to identify the MCH and that is sent by the base station includes:

receiving, by the UE, a system information block SIB sent by the base station, where the SIB includes a corresponding RNTI allocated to the MCH by the base station.

With reference to the fourth possible implementation manner of the second aspect, in a ninth possible implementation manner, the receiving, by the UE, a radio network temporary identifier RNTI that is used to identify the MCH and that is sent by the base station includes:

receiving, by the UE by using a multicast control channel MCCH, an RNTI, of the MCH, that is determined by a multicast coordination entity MCE and that is sent by the base station.

With reference to the ninth possible implementation manner of the second aspect, in a tenth possible implementation manner, the method further includes:

if the RNTI that is of the MCH and that is determined by the MCE is used as a cell radio network temporary identifier C-RNTI by the UE, receiving, by the UE, a new RNTI sent by the base station and using the new RNTI as the C-RNTI.

With reference to the second possible implementation manner of the second aspect, in an eleventh possible implementation manner, the instruction information is a preset value of a stop identifier field in the MSI, and the preset value includes a reserve value.

According to a third aspect, an embodiment of the present invention provides a base station, where the base station includes a communications unit and a processing unit, where the communications unit is configured to communicate with user equipment UE; and the processing unit is configured to:

send, by using the communications unit, group service data to the UE within one multicast channel scheduling period MSP on a multimedia broadcast multicast service single frequency network MBSFN subframe corresponding to a multicast channel MCH;

when the group service data cannot be completely sent on the MBSFN subframe that is corresponding to the MCH and that is within the MSP, send, by using the communications unit and on one or more other subframes except the MBSFN subframe corresponding to the MCH, remaining group service data that cannot be sent on the MBSFN subframe corresponding to the MCH; and instruct, by using the communications unit, the UE to receive the remaining data on the one or more other subframes.

With reference to the third aspect, in a first possible implementation manner, the processing unit is further configured to:

send, by using the communications unit, scheduling information that includes instruction information to the UE, where the instruction information is used to instruct the UE to receive the remaining data on the one or more other subframes.

With reference to the first possible implementation manner of the third aspect, in a second possible implementation manner, the scheduling information includes: multicast channel scheduling information MSI or a Media Access Control-control element MAC-CE.

With reference to the first possible implementation manner of the third aspect, in a third possible implementation manner, the processing unit is further configured to:

send time instruction information to the UE by using the communications unit, where the time instruction information is used to instruct the UE to receive, according to the instruction information, the remaining data within a preset time period.

With reference to the first, the second, or the third possible implementation manner of the third aspect, in a fourth possible implementation manner, the processor executing the computer code is further configured to:

send, by using the communications unit, a radio network temporary identifier RNTI used to identify the MCH to the UE, where the instruction information is used to instruct the UE to receive, according to the received RNTI, the remaining data on the one or more other subframes.

With reference to the third aspect, in a fifth possible implementation manner, the processor executing the computer code is further configured to:

instruct, by using the communications unit, the UE to obtain a logical channel identifier LCID carried in a Media Access Control protocol data unit MAC PDU in the packet, so as to determine, according to a correspondence between the LCID and the session, the session corresponding to the packet.

With reference to the fifth possible implementation manner of the third aspect, in a sixth possible implementation manner, the LCID is an LCID used when the base station sends the group service data by using the MBSFN subframe.

With reference to the third aspect, in a seventh possible implementation manner, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

With reference to the fourth possible implementation manner of the third aspect, in an eighth possible implementation manner, the processing unit is further configured to:

allocate a corresponding RNTI to the MCH, and send the allocated RNTI in a system information block SIB to the UE by using the communications unit.

With reference to the fourth possible implementation manner of the third aspect, in a ninth possible implementation manner, the processing unit is further configured to:

send, by using the communications unit and by using a multicast control channel MCCH, an RNTI that is of the MCH and that is determined by a multicast coordination entity MCE to the UE.

With reference to the ninth possible implementation manner of the third aspect, in a tenth possible implementation manner, the processing unit is further configured to:

if the RNTI that is of the MCH and that is determined by the MCE is allocated by the base station to any UE accessing the base station and used as a cell radio network temporary identifier C-RNTI of the any UE, replace the RNTI with a new RNTI for the any UE as the C-RNTI of the any UE.

With reference to the second possible implementation manner of the third aspect, in an eleventh possible implementation manner, the instruction information is a preset value of a stop identifier field in the MSI, and the preset value includes a reserve value.

According to a fourth aspect, an embodiment of the present invention provides user equipment, where the user equipment includes a communications unit and a processing unit, where the communications unit is configured to communicate with a base station; and the processing unit is configured to:

when group service data sent, by the base station, on a multimedia broadcast multicast service single frequency network MBSFN subframe corresponding to a multicast channel MCH is received by using the communications unit, receive, by using the communications unit, instruction information sent by the base station, where the instruction information is used to instruct the user equipment to receive, on one or more other subframes except the MBSFN subframe corresponding to the MCH, remaining group service data that cannot be sent on the MBSFN subframe corresponding to the MCH; and receive the remaining data on the one or more other subframes according to the instruction information and by using the communications unit.

With reference to the fourth aspect, in a first possible implementation manner, the processing unit is further configured to:

receive, by using the communications unit, scheduling information that includes the instruction information and that is sent by the base station.

With reference to the first possible implementation manner of the fourth aspect, in a second possible implementation manner, the scheduling information includes: multicast channel scheduling information MSI or a Media Access Control-control element MAC-CE.

With reference to the fourth aspect, in a third possible implementation manner, the processing unit is further configured to:

receive, by using the communications unit, time instruction information sent by the base station, where the time instruction information is used to instruct the user equipment to receive, according to the instruction information, the remaining data within a preset time period.

With reference to any one of the fourth aspect, or the first to the third possible implementation manners of the fourth aspect, in a fourth possible implementation manner, the processing unit is further configured to:

receive, by using the communications unit, a radio network temporary identifier RNTI that is used to identify the MCH and that is sent by the base station, where the instruction information is used to instruct the user equipment to receive, according to the received RNTI, the remaining data on the one or more other subframes.

With reference to the fourth aspect, in a fifth possible implementation manner, the processing unit is further configured to:

obtain a logical channel identifier LCID carried in a Media Access Control protocol data unit MAC PDU in the packet, so as to determine, according to a correspondence between the LCID and the session, the session corresponding to the packet.

With reference to the fifth possible implementation manner of the fourth aspect, in a sixth possible implementation manner, the LCID is an LCID used when the base station sends the group service data by using the MBSFN subframe.

With reference to the fourth aspect, in a seventh possible implementation manner, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

With reference to the fourth possible implementation manner of the fourth aspect, in an eighth possible implementation manner, the processing unit is further configured to:

receive, by using the communications unit, a system information block SIB sent by the base station, where the SIB includes a corresponding RNTI allocated to the MCH by the base station.

With reference to the fourth possible implementation manner of the fourth aspect, in a ninth possible implementation manner, the processing unit is further configured to:

receive, by using the communications unit and by using a multicast control channel MCCH, an RNTI, of the MCH, that is determined by a multicast coordination entity MCE and that is sent by the base station.

With reference to the ninth possible implementation manner of the fourth aspect, in a tenth possible implementation manner, the processing unit is further configured to:

if the RNTI that is of the MCH and that is determined by the MCE is used as a cell radio network temporary identifier C-RNTI by the user equipment, receive a new RNTI sent by the base station and using the new RNTI as the C-RNTI.

With reference to the second possible implementation manner of the fourth aspect, in an eleventh possible implementation manner, the instruction information is a preset value of a stop identifier field in the MSI, and the preset value includes a reserve value.

According to the method for transmitting MBMS group service data, the base station, and the user equipment that are provided in the embodiments of the present invention, a base station sends group service data to user equipment within one MSP on an MBSFN subframe corresponding to an MCH. When the base station cannot completely send the group service data within the MSP on the MBSFN subframe corresponding to the MCH, the base station sends, on one or more other subframes except the MBSFN subframe corresponding to the MCH, remaining group service data that cannot be sent on the MBSFN subframe corresponding to the MCH. The base station instructs the user equipment to receive the remaining data on the one or more other subframes. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the user equipment, so that radio resources may be efficiently utilized.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 6 is a schematic diagram of an effect of a method for transmitting MBMS group service data according to an embodiment of the present invention;

FIG. 7 is a schematic flowchart 4 of a method for transmitting MBMS group service data according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Before describing technical solutions provided in the embodiments of the present invention, some conceptions and basic principles related to the embodiments of the present invention are first expounded, so that persons skilled in the art clearly and accurately understand the technical solutions provided in the embodiments of the present invention.

Figure 1:
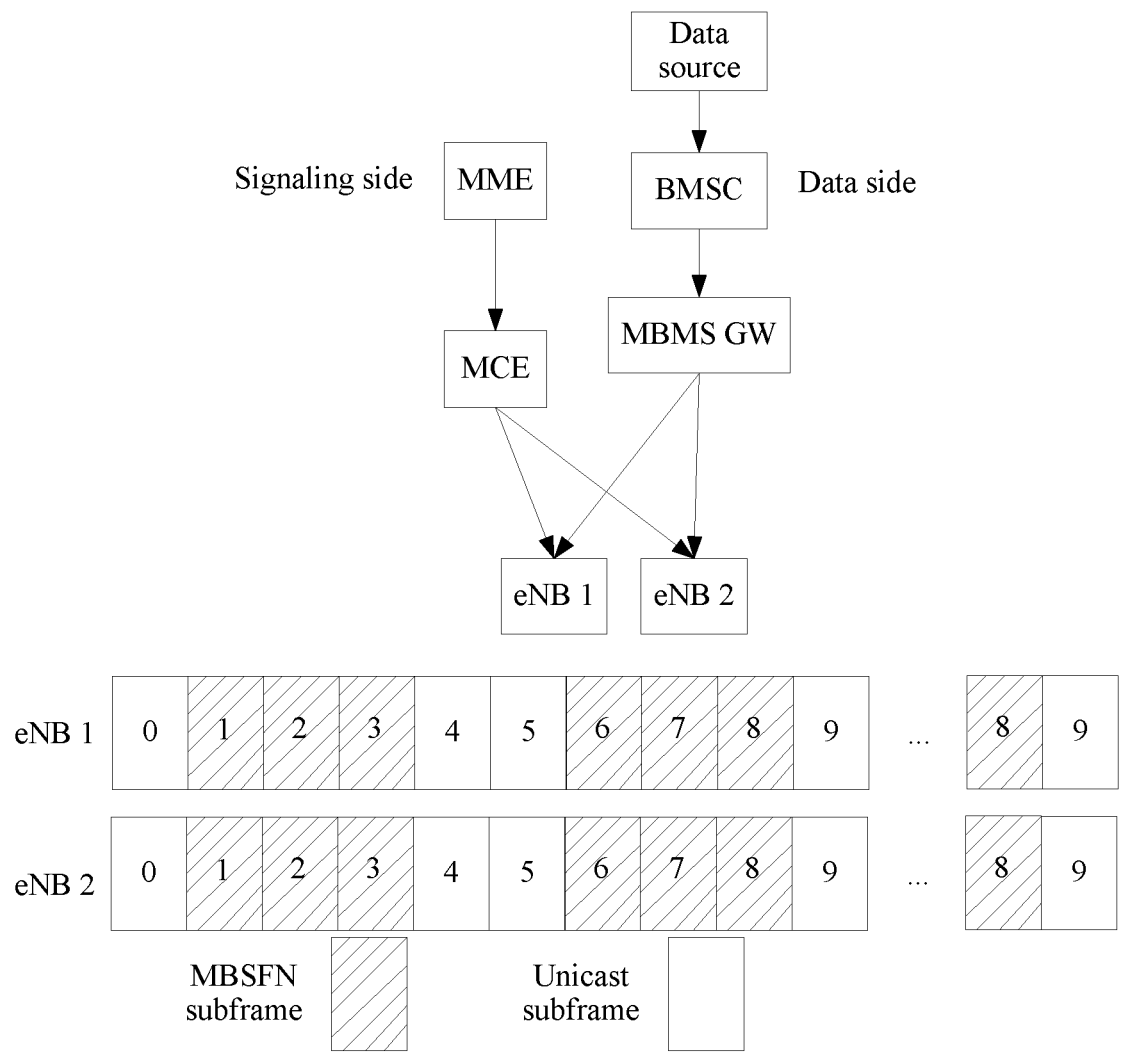
FIG. 1 is a schematic flowchart of an MBMS service in the prior art.

A basic process of an MBMS service is shown in FIG. 1: After a service packet is sent from a data source to a broadcast multicast service center (BMSC), and processing such as shaping or adding a timestamp is performed on the service packet, the BMSC sends the service packet to an MBMS gateway (MBMS-GW); then the MBMS-GW sends the service packet to all eNBs within a range of one or more MBSFN areas by using a multi-address broadcast or multicast (IP multicast) technology; an eNB finally sends the service packet to UE by using a radio channel.

In FIG. 1, multiple eNBs need to transmit same content at the same time. Therefore, a multi-cell/multicast coordination entity (MCE) is introduced in LTE. The MCE configures related parameters of the MBMS service transmission and allocates same MBSFN subframes for transmitting the MBMS service for all cells within a range of a same MBSFN area, and allocates the MBSFN subframes into several MSPs. In addition, the BMSC adds a timestamp to each service packet. The eNB determines, according to the timestamp and MCH scheduling information (MSI), a specific MSP in which each packet should be transmitted. It should be noted that in an existing technical solution, a packet can be transmitted only in a corresponding MSP, and the eNB cannot transmit the packet in another MSP.

Figure 2:
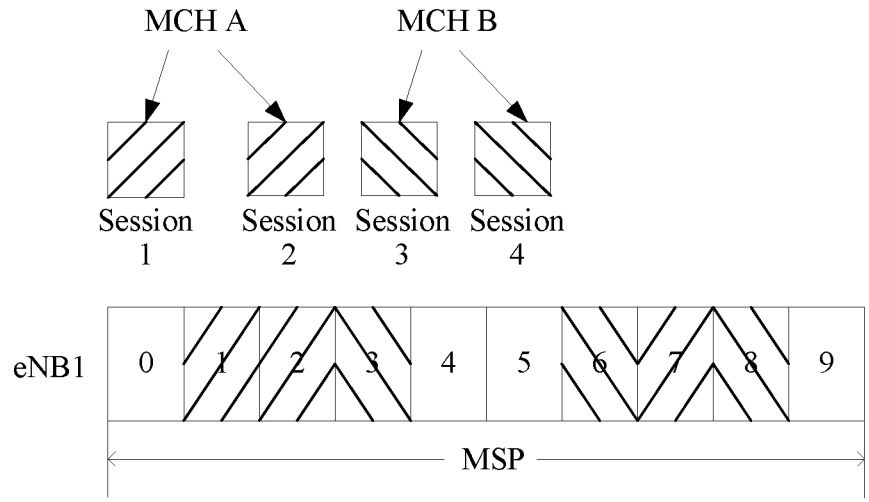
FIG. 2 is a schematic diagram of sharing an MCH by multiple session services within one MSP in the prior art.

One MBSFN area may support multiple MCHs. The MCE needs to allocate all MBSFN subframes to all MCHs. One MBSFN subframe can belong to only one MCH. One MCH may be multiplexed by multiple session services of the MBMS. The MCE needs to notify the eNB of the configuration information. As shown in FIG. 2, an MCH A and an MCH B are in a same MSP. The MCH A occupies subframes 1, 2, and 7 and carries a session 1 and a session 2; the MCH B occupies subframes 3, 6, and 8, and carries a session 3 and a session 4. It should be noted that the subframes 1, 2, 3, 6, 7, and 8 are MBSFN subframes, and subframes 0, 4, 5, and 9 are unicast subframes. In addition, the group service described in the embodiments of the present invention includes at least one session service. It should be specially noted that the technical solutions provided in the embodiments of the present invention are also applicable to an ordinary MBMS service. When a data burst occurs in an ordinary MBMS service, using the technical solutions provided in the embodiments of the present invention can effectively reduce a packet loss and improve data sending efficiency.

Figure 3:
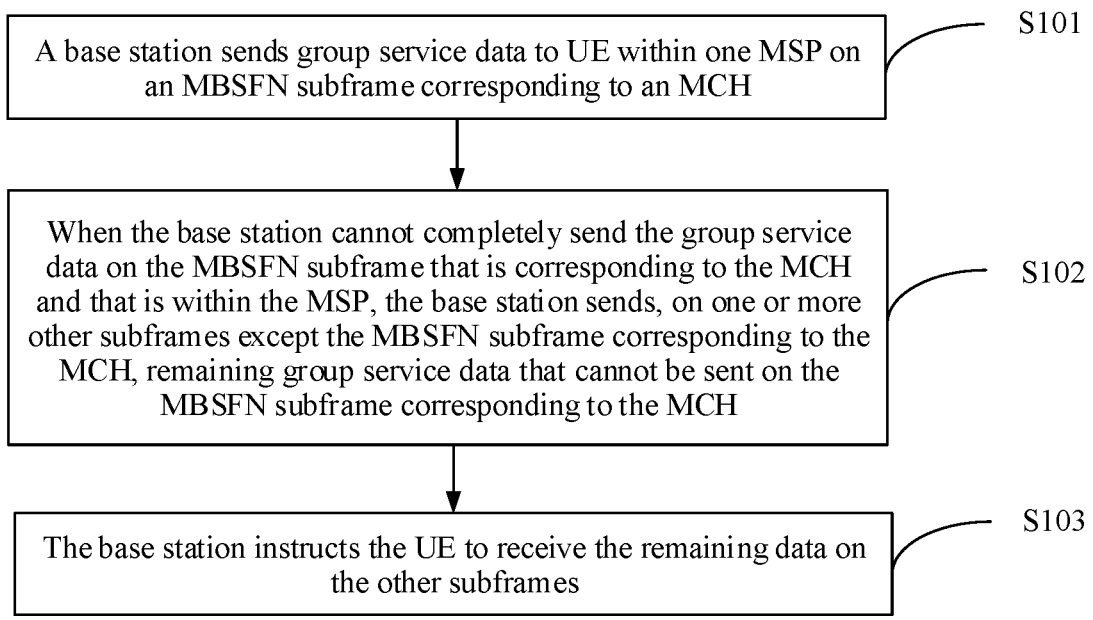
FIG. 3 is a schematic flowchart 1 of a method for transmitting MBMS group service data according to an embodiment of the present invention.

An embodiment of the present invention provides a method for transmitting MBMS group service data. Based on a base station side, as shown in FIG. 3, the method includes:

S101. A base station sends group service data to UE within one MSP on an MBSFN subframe corresponding to an MCH.

S102. When the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH.

S103. The base station instructs the UE to receive the remaining data on the one or more other subframes.

According to the method for transmitting MBMS group service data provided in this embodiment of the present invention, a base station sends group service data to UE within one MSP on an MBSFN subframe corresponding to an MCH. When the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH. The base station instructs the UE to receive the remaining data on the one or more other subframes. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the UE, so that radio resources may be efficiently utilized.

Figure 4:
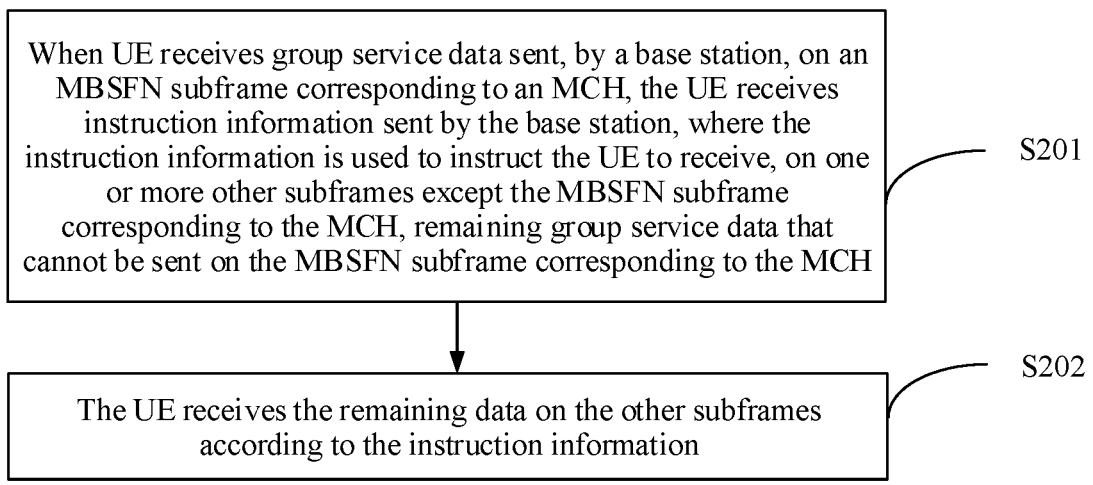
FIG. 4 is a schematic flowchart 2 of a method for transmitting MBMS group service data according to an embodiment of the present invention.

An embodiment of the present invention provides a method for transmitting MBMS group service data. Based on a UE side, as shown in FIG. 4, the method includes:

S201. When UE receives group service data sent, by a base station, on an MBSFN subframe corresponding to an MCH, the UE receives instruction information sent by the base station, where the instruction information is used to instruct the UE to receive, on one or more other subframes except the MBSFN subframe corresponding to the MCH, remaining group service data that cannot be sent on the MBSFN subframe corresponding to the MCH.

S202. The UE receives the remaining data on the one or more other subframes according to the instruction information.

According to the method for transmitting MBMS group service data provided in this embodiment of the present invention, when UE receives group service data sent, by a base station, on an MBSFN subframe corresponding to an MCH, the UE receives instruction information sent by the base station. The instruction information is used to instruct the UE to receive, on one or more other subframes except the MBSFN subframe corresponding to the MCH, remaining group service data that cannot be sent on the MBSFN subframe corresponding to the MCH. The UE receives the remaining data on the one or more other subframes according to the instruction information. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the UE, so that radio resources may be efficiently utilized.

Figure 5:
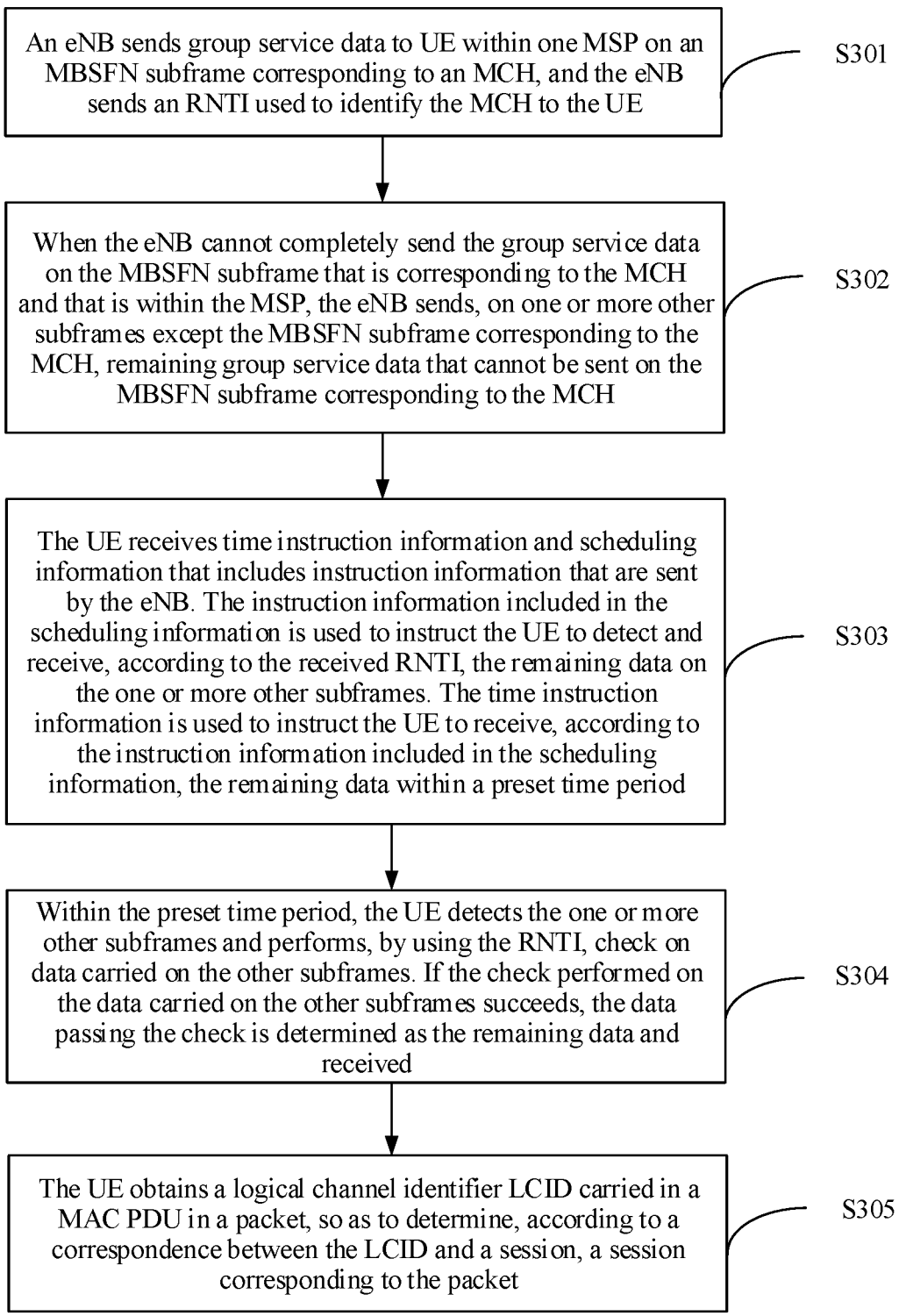
FIG. 5 is a schematic flowchart 3 of a method for transmitting MBMS group service data according to an embodiment of the present invention.

To make persons skilled in the art more clearly understand the technical solutions provided in the embodiments of the present invention, the following describes in detail, by using specific embodiments, a method for transmitting MBMS group service data provided in an embodiment of the present invention. An eNB is used as an example of a base station. As shown in FIG. 5, the method includes:

S301. An eNB sends group service data to UE within one MSP on an MBSFN subframe corresponding to an MCH, and the eNB sends an RNTI used to identify the MCH to the UE.

Specifically, the eNB allocates a corresponding RNTI to the MCH that carries a group service, and sends the allocated RNTI in a system information block SIB to the UE.

For example, when discovering that a Group service needs to be sent, the eNB allocates a corresponding RNTI to each MCH that carries the Group service. The eNB sends the RNTI in an SIB to the UE, and may select SIB 13, or another SIB;

or specifically, the eNB sends, by using an MCCH, an RNTI determined by an MCE to the UE. If the RNTI determined by the MCE is allocated by the eNB to any UE accessing the eNB and used as a cell radio network temporary identifier C-RNTI of the any UE, the eNB replaces the RNTI with a new RNTI for the any UE as the C-RNTI of the any UE.

For example, the MCE may uniformly determine an RNTI for an MCH. The MCE sends the determined RNTI to the eNB by using the MCCH, and then the eNB sends, by using the MCCH, the RNTI determined by the MCE to the UE. In this way, adding too much content to the SIB may be avoided. The RNTI determined by the MCE for use may be reserved in advance, for example, a communications protocol may stipulate that some RNTIs are reserved for use when a Group service burst occurs; or the RNTI determined by the MCE for use may not be reserved in advance, and may be selected from the RNTIs when actually needed. If the MCE uses the manner of no reservation, the eNB needs to make a judgment. If the RNTI determined by the MCE to be used by the MCH is allocated by the eNB to UE as the C-RNTI, the eNB needs to replace the C-RNTI for the UE. Here, a reason for replacing the C-RNTI for the UE by the eNB is briefly described as follows: If the eNB does not replace the C-RNTI for the UE, because the eNB scrambles an instruction of the Group service by using the RNTI, and when receiving a packet by using the RNTI, the UE performs CRC check, when receiving data, the UE may be incapable of identifying whether the data belongs to data that the UE needs.

S302. When the eNB cannot completely send the group service data on the MBSFN subframe that is corresponding to the MCH and that is within the MSP, the eNB sends, on one or more other subframes except the MBSFN subframe corresponding to the MCH, remaining group service data that cannot be sent on the MBSFN subframe corresponding to the MCH.

The one or more other subframes include: a unicast subframe within the MSP and behind a subframe corresponding to multicast channel scheduling information MSI; M unicast subframes after the MSP ends; or N MBSFN subframes that are used by another MCH other than the MCH in the same MBSFN area and that are behind the subframe corresponding to the MSI. M and N are positive integers.

For example, as shown in FIG. 6, the one or more other subframes may be a unicast subframe 4, a unicast subframe 5, and/or a unicast subframe 9 within the MSP and behind a subframe 1 corresponding to the MSI; or as shown in FIG. 6, the one or more other subframes may be a unicast subframe 0, a unicast subframe 4, a unicast subframe 5, and/or a unicast subframe 9 within a next MSP after the MSP ends; or as shown in FIG. 2, the one or more other subframes may be further an MBSFN subframe 3, an MBSFN subframe 6, and/or an MBSFN subframe 8 that are used by an MCH B except an MCH A in the same MBSFN area and that are behind a subframe 1 (it is assumed that the MSI is corresponding to the subframe 1).

S303. The UE receives time instruction information and scheduling information that includes instruction information, where the time instruction information and the scheduling information are sent by the eNB. The instruction information included in the scheduling information is used to instruct the UE to detect and receive, according to the received RNTI, the remaining data on the one or more other subframes. The time instruction information is used to instruct the UE to receive, according to the instruction information included in the scheduling information, the remaining data within a preset time period.

Specifically, the scheduling information includes MSI or a MAC-CE, and the instruction information may be carried in the MSI or the MAC-CE.

More specifically, the instruction information may be a preset value of a stop identifier field in the MSI, where the preset value includes a reserve value; or the instruction information may be further an LCID in the MAC-CE, where the LCID is an LCID of a session on which a packet loss occurs.

For example, as shown in FIG. 6, the eNB may fill a preset value into a stop indication field (stop indication) corresponding to a session 4 on which a packet loss occurs in the MSI, so as to instruct the UE. The preset value herein may be one selected from the reserve values, or may be some normal values. For example, normally, stop indication values corresponding to all sessions in the MSI are incremental, that is, a stop indication value corresponding to a session can only be greater than or equal to a stop indication value corresponding to a previous session of the session. When a packet loss occurs, the eNB may fill a relatively small value into the stop indication corresponding to the session 4, and the value is less than a value corresponding to a previous session. In this manner, the UE may learn that some packets of the session 4 are not sent on the subframe corresponding to the MBSFN, but sent on a following subframe (such as the unicast subframe 4 in the next MSP in FIG. 6). To ensure that all eNBs fill a same value into this location, the preset value may be further stipulated in advance, such as 1/0, or agreed to be reduced by 1 or 2 compared with a value corresponding to a previous session. Alternatively, the eNB sends, in the MAC-CE, an LCID of a session on which a packet loss occurs to the UE as instruction information. After receiving the LCID, the UE may determine that it is necessary to receive a remaining packet on the one or more other subframes.

S304. Within the preset time period, the UE detects the one or more other subframes and performs, by using the RNTI, check on data carried on the one or more other subframes. If the check performed on the data carried on the one or more other subframes succeeds, the data passing the check is determined as the remaining data and received.

It should be noted that in this embodiment of the present invention, burst data, that is, the remaining data, of the Group service may be transmitted in a dynamic scheduling manner. The dynamic scheduling manner means that the eNB transmits the remaining data of the Group service on the one or more other subframes; the UE performs blind detection of a physical downlink control channel (PDCCH) or an enhanced physical downlink control channel (ePDCCH) on the one or more other subframes one by one, and performs cyclic redundancy check (CRC) by using the RNTI until CRC check performed on a subframe by using the RNTI succeeds and the remaining data of the Group service is received. For example, as shown in FIG. 6, the UE at least needs to perform the blind detection of the PDCCH starting from the unicast subframe 4 within the MSP, and perform the CRC check by using the RNTI. The remaining data of the Group service cannot be detected and received until the unicast subframe 4 within the next MSP. It may be learned that in this manner, the UE side needs to perform a large amount of blind detection, increasing power consumption of the UE. In this embodiment of the present invention, the burst data may be further transmitted in a semi-static scheduling manner. The semi-static scheduling manner means that the eNB transmits the remaining data of the Group service on the one or more other subframes, and instructs the UE to perform the blink detection of the PDCCH starting from a subframe in the one or more other subframes one by one, and perform the CRC check by using the RNTI until CRC check performed on a subframe by using the RNTI succeeds and the remaining data of the Group service is received. For example, as shown in FIG. 6, the eNB instructs the UE to perform the blind detection of the PDCCH starting from the unicast subframe 9 within the MSP, and perform the CRC check by using the RNTI until the remaining data of the Group service is detected and received on the unicast subframe 4 within the next MSP. It may be learned that in this manner, blind detection workload on the UE side may be reduced to some extent, thereby reducing power consumption of the UE. In this embodiment of the present invention, the burst data may be further transmitted in a static scheduling manner. The static scheduling manner means that the eNB transmits the remaining data of the Group service on a subframe or several subframes of the one or more other subframes, and instructs the UE to perform the blind detection of the PDCCH on the subframe or the several subframes, and perform the CRC check by using the RNTI until the check succeeds and the remaining data of the Group service is received. For example, as shown in FIG. 6, the eNB instructs the UE to perform the blind detection of the PDCCH starting from the unicast subframe 4 within the next MSP, and perform the CRC check by using the RNTI, so as to receive remaining data of the Group service. It may be learned that in this manner, the blind detection workload on the UE side may be minimized, thereby reducing power consumption of the UE. It is worth mentioning that in the static scheduling manner, if the Group service data burst does not occur, a subframe pre-specified by the eNB may be used to send data of another service.

In addition, in this embodiment of the present invention, the preset time period in the foregoing time instruction information is used to limit scheduling time of the foregoing three scheduling manners. The eNB or the MCE may dispose a timer or a counter and notify the UE (when the timer or the counter is disposed by the eNB, the eNB notifies the UE by using the SIB; when the timer or the counter is disposed by the MCE, the MCE notifies the eNB and the UE by using the MCCH). The foregoing timer or counter may start timing/counting when an MSP corresponding to a current MCH ends, or may start timing/counting at a moment before an MSP corresponding to the current MCH ends, provided that the start time is later than time of a subframe corresponding to the MSI in the MSP corresponding to the current MCH. In this way, the eNB and the UE both start the timer or the counter at the same time to start timing/counting. The eNB may select an opportunity within a preset time period determined when the timer or the counter reaches a maximum count value to send data. The UE receives data within the preset time period. It is worth mentioning that a moment at which the timer or the counter is started may be stipulated by a communications protocol, for example, may be stipulated to be in an Nth subframe behind the subframe corresponding to the MSI, or may be determined by the MCE and the MCE notifies the eNB and the UE by using the MCCH. The preset time period determined by the timer or the counter may be shared by all MCHs.

It should be further specially noted that for the foregoing two manners: the eNB determines an RNTI corresponding to the MCH or the MCE uniformly determines an RNTI corresponding to the MCH, the RNTI corresponding to the MCH may be shared by all MCHs. If an RNTI is shared, the one or more other subframes used by multiple MCHs may be differentiated according to a specific rule. For example, two MCHs may be differentiated in a parity manner; a network side allocates an odd subframe in the one or more other subframes to an MCH 1, and allocates an even subframe to an MCH 2. The UE uses a same RNTI to detect the one or more other subframes; and if data is detected, determines, according to the odd subframe or the even subframe, that the detected data is data of a specific MCH.

S305. The UE obtains a logical channel identifier LCID carried in a MAC PDU in a packet, so as to determine, according to a correspondence between the LCID and a session, a session corresponding to the packet.

The LCID carried in the MAC PDU in the packet is an LCID used when the eNB sends the group service data by using the MBSFN subframe.

For example, as shown in FIG. 6, a part of data of the session 4 cannot be sent by using the MBSFN subframe and is sent on the unicast subframe 4 within the next MSP. After the UE performs the blind detection of the PDCCH on the unicast subframe 4 and performs the CRC check by using the RNTI, the check succeeds and the data of the session 4 is obtained. It is assumed that neither a part of data of the session 3 nor a part of data of the session 4 can be sent by using the MBSFN subframe, and the eNB sends the part of data of the session 3 and the part of data of the session 4 on the unicast subframe 4 within the next MSP. In this case, after the UE performs the blind detection of the PDCCH on the unicast subframe 4 and performs the CRC check by using the RNTI, the check succeeds and the part of data of the session 3 and the part of data of the session 4 are obtained. The UE may learn, by determining an LCID carried in a MAC PDU in the obtained packet, whether the packet belongs to the session 3 or the session 4.

According to the method for transmitting MBMS group service data provided in this embodiment of the present invention, an eNB sends group service data to UE within one MSP on an MBSFN subframe corresponding to an MCH. When the eNB cannot completely send the group service data on the MBSFN subframe that is corresponding to the MCH and that is within the MSP, the eNB sends, on one or more other subframes except the MBSFN subframe corresponding to the MCH, remaining group service data that cannot be sent on the MBSFN subframe corresponding to the MCH. The eNB instructs the UE to receive the remaining data on the one or more other subframes. The UE receives the remaining data on the one or more other subframes according to the notification of the eNB. In this way, with no need to allocate a large quantity of MBSFN subframes to a group service, when a data burst occurs, the eNB uses the one or more other subframes except the MBSFN subframe corresponding to the MCH that carries the group service to transmit a remaining packet to the UE, so that radio resources may be efficiently utilized.

An embodiment of the present invention further provides a method for transmitting MBMS group service data. As shown in FIG. 7, the method includes:

S401. When a group service starts, an MCE notifies an eNB that the started service is a group service.

Specifically, the notification may be explicit, for example, the MCE sets a Boolean variable in a service starting message sent to the eNB. If a value of the variable is true, it indicates that the started service is a Group service; or if a value of the variable is false, it indicates that the started service is an ordinary MBMS service.

Alternatively, when the MCE notifies the eNB, messages of two different types are used to differentiate an ordinary MBMS service and a Group service. The eNB may learn, according to a message type, whether a service is a Group service or an ordinary MBMS service.

The notification may also be implicit, for example, it is pre-stipulated that the MCE arranges the Group service at top five locations of a session list of MBMS scheduling information, and behind the Group service is the ordinary MBMS service.

S402. After receiving the notification from the MCE, the eNB determines that an MCH carries the group service, and hands over UE that is not in a TM9/10 and that is in a cell in which the eNB is located to another cell.

It should be noted that, that the eNB hands over the UE that is not in the TM9/10 and that is in the cell in which the eNB is located to another cell may effectively increase a proportion of the UE in the TM9/10 in the cell, and the UE in the TM9/10 may effectively utilize all subframes of an MCH.

Figure 8:
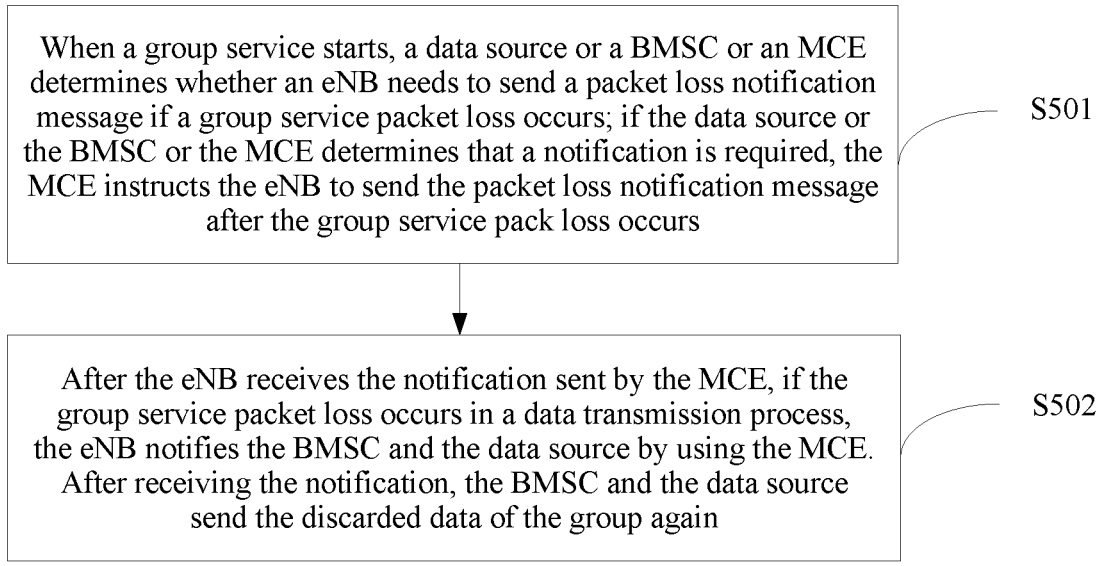
FIG. 8 is a schematic flowchart 5 of a method for transmitting MBMS group service data according to an embodiment of the present invention.

An embodiment of the present invention further provides a method for transmitting MBMS group service data. As shown in FIG. 8, basic steps of the method include:

S501. When a group service starts, a data source or a BMSC or an MCE determines whether an eNB needs to send a packet loss notification message if a group service packet loss occurs; if the data source or the BMSC or the MCE determines that a notification is required, the MCE instructs the eNB to send the packet loss notification message after the group service pack loss occurs.

Specifically, a manner of notifying the eNB by the MCE may be the same as a manner in S401.

S502. After the eNB receives the notification sent by the MCE, if the group service packet loss occurs in a data transmission process, the eNB notifies the BMSC and the data source by using the MCE. After receiving the notification, the BMSC and the data source send the discarded data of the group again.

Figure 9:
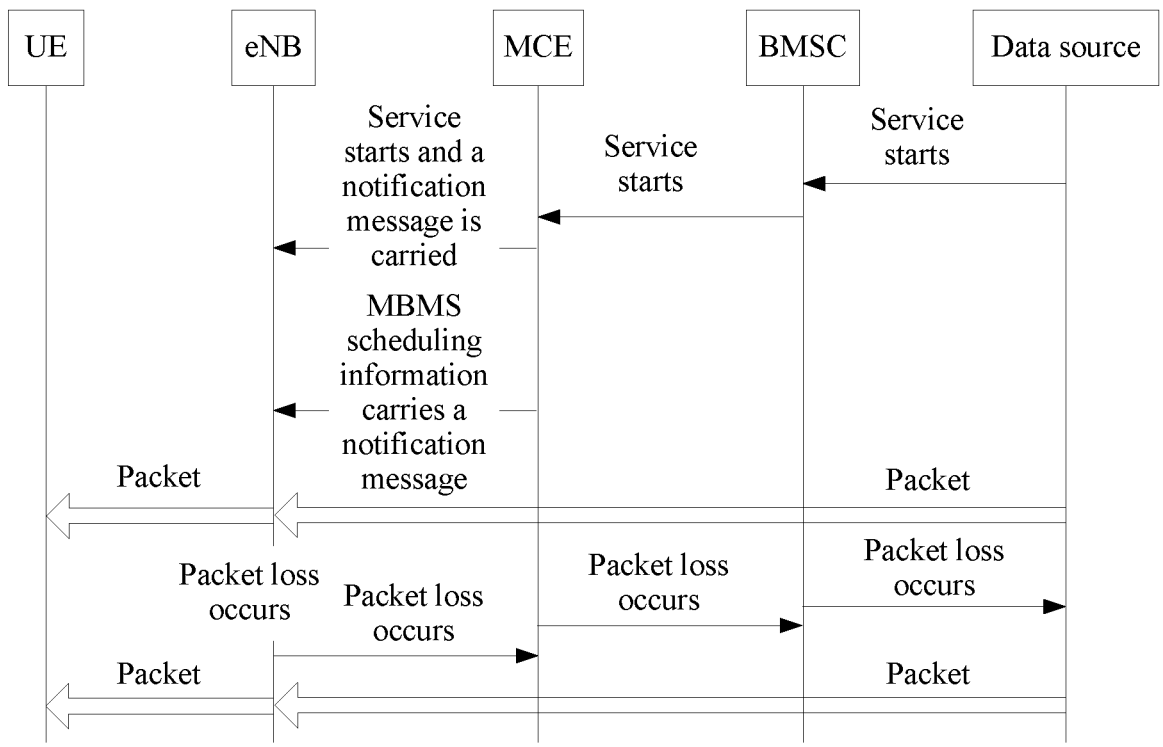
FIG. 9 is a schematic diagram of an effect of another method for transmitting MBMS group service data according to an embodiment of the present invention.

FIG. 9 is a schematic diagram of an effect of another method for transmitting MBMS group service data.

An embodiment of the present invention further provides another method for transmitting MBMS group service data. A technical solution is: an MCE learns, from a BMSC or a data source, that a type of a current service is a Group service, selects an MCH, multiplexes the Group service and an ordinary MBMS service to the same MCH, where the Group service has a higher priority than the ordinary MBMS service, and informs the eNB of the foregoing work. The MCE arranges the Group service on the top of a service list of MBMS scheduling information, and arranges the ordinary MBMS service behind the Group service. When a Group service burst occurs, during scheduling, the eNB first discards a service arranged at the bottom of the session list, that is, the ordinary MBMS service. Using this method may greatly reduce a probability that a Group service packet is discarded.

Figure 10:
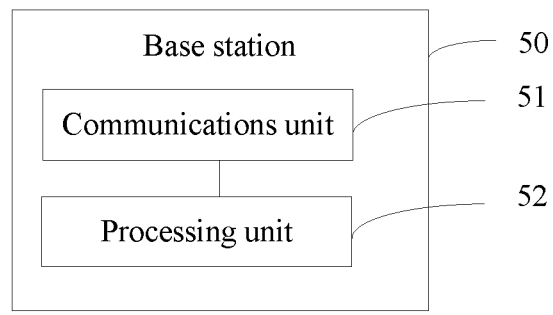
FIG. 10 is a schematic structural diagram of a base station according to an embodiment of the present invention.

An embodiment of the present invention provides a base station 50. As shown in FIG. 10, the base station 50 includes a communications unit 51 and a processing unit 52.

The communications unit 51 is configured to communicate with user equipment UE.

The processing unit 52 is configured to:

send, by using the communications unit 51, group service data to the UE within one multicast channel scheduling period MSP on a multimedia broadcast multicast service single frequency network MBSFN subframe corresponding to a multicast channel MCH; and when the group service data cannot be completely sent on the MBSFN subframe that is corresponding to the MCH and that is within the MSP, send, by using the communications unit 51 and on one or more other subframes except the MBSFN subframe corresponding to the MCH, remaining group service data that cannot be sent on the MBSFN subframe corresponding to the MCH; and instruct, by using the communications unit 51, the UE to receive the remaining data on the one or more other subframes.

Optionally, the processing unit 52 is further configured to:

send, by using the communications unit 51, scheduling information that includes instruction information to the UE, where the instruction information is used to instruct the UE to receive the remaining data on the one or more other subframes.

Optionally, the scheduling information includes: multicast channel scheduling information MSI or a Media Access Control-control element MAC-CE.

Optionally, the processing unit 52 is further configured to:

send time instruction information to the UE by using the communications unit 51, where the time instruction information is used to instruct the UE to receive, according to the instruction information, the remaining data within a preset time period.

Optionally, the processing unit 52 is further configured to:

send, by using the communications unit 51, a radio network temporary identifier RNTI used to identify the MCH to the UE.

The instruction information is used to instruct the UE to receive, according to the received RNTI, the remaining data on the one or more other subframes.

Optionally, the processing unit 52 is further configured to:

instruct, by using the communications unit 51, the UE to obtain a logical channel identifier LCID carried in a Media Access Control protocol data unit MAC PDU in the packet, so as to determine, according to a correspondence between the LCID and the session, the session corresponding to the packet.

Optionally, the LCID is an LCID used when the base station sends the group service data by using the MBSFN subframe.

Optionally, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

Optionally, the processing unit 52 is further configured to:

allocate a corresponding RNTI to the MCH, and send the allocated RNTI in a system information block SIB to the UE by using the communications unit 51.

Optionally, the processing unit 52 is further configured to:

send, by using the communications unit 51 and by using a multicast control channel MCCH, an RNTI that is of the MCH and that is determined by a multicast coordination entity MCE to the UE.

Optionally, the processing unit 52 is further configured to:

if the RNTI that is of the MCH and that is determined by the MCE is allocated by the base station to any UE accessing the base station and used as a cell radio network temporary identifier C-RNTI of the any UE, replace the RNTI with a new RNTI for the any UE as the C-RNTI of the any UE.

Optionally, the instruction information is a preset value of a stop identifier field in the MSI, and the preset value includes a reserve value.

It should be noted that the communications unit 51 in this embodiment may be a transceiver, a transceiver circuit, or the like of the base station. The processing unit 52 may be a standalone processor, or may be integrated into a processor of the base station for implementation, and in addition, may also be stored in a memory of the base station in a form of program code, and functions of the foregoing processing unit are invoked and executed by a processor of the base station. The processor described herein may be a central processing unit (CPU), or an application-specific integrated circuit (ASIC), or one or more integrated circuits configured to implement this embodiment of the present invention.

According to the base station provided in this embodiment of the present invention, a base station sends group service data to UE within one MSP on an MBSFN subframe corresponding to an MCH. When the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH. The base station instructs the UE to receive the remaining data on the one or more other subframes. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the UE, so that radio resources may be efficiently utilized.

Figure 11:
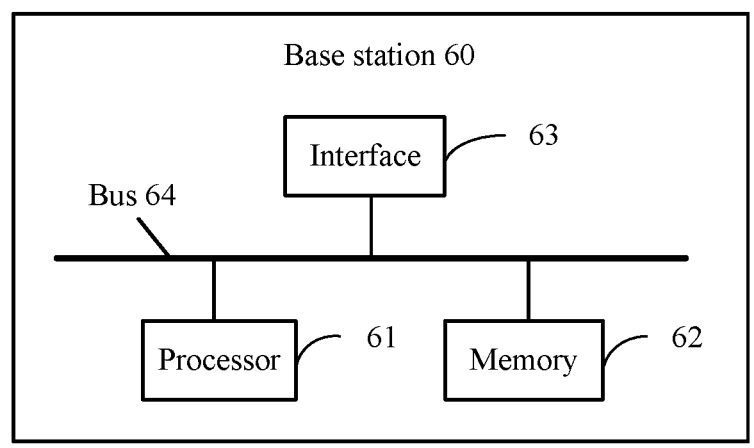
FIG. 11 is a schematic structural diagram of another base station according to an embodiment of the present invention.

An embodiment of the present invention further provides a base station 60. As shown in FIG. 11, the base station 60 includes: a bus 64; and a processor 61, a memory 62, and an interface 63 that are connected to the bus 64, where the interface 63 is configured to perform communication, the memory 62 is configured to store computer code, and the processor 61 is configured to execute the computer code to:

send group service data to user equipment UE within one multicast channel scheduling period MSP on a multimedia broadcast multicast service single frequency network MBSFN subframe corresponding to a multicast channel MCH;

when the group service data cannot be completely sent on the MBSFN subframe that is corresponding to the MCH and that is within the MSP, send, on one or more other subframes except the MBSFN subframe corresponding to the MCH, remaining group service data that cannot be sent on the MBSFN subframe corresponding to the MCH; and instruct the UE to receive the remaining data on the one or more other subframes.

Optionally, the processor 61 is configured to execute the computer code to instruct the UE to receive the remaining data on the one or more other subframes, and specifically configured to:

send scheduling information that includes instruction information to the UE, where the instruction information is used to instruct the UE to receive the remaining data on the one or more other subframes.

Optionally, the scheduling information includes: multicast channel scheduling information MSI or a Media Access Control-control element MAC-CE.

Optionally, the processor 61 is configured to execute the computer code to instruct the UE to receive the remaining data on the one or more other subframes, and specifically configured to:

send time instruction information to the UE, where the time instruction information is used to instruct the UE to receive, according to the instruction information, the remaining data within a preset time period.

Optionally, the processor 61 executing the computer code is further configured to:

send a radio network temporary identifier RNTI used to identify the MCH to the UE.

The instruction information is used to instruct the UE to receive, according to the received RNTI, the remaining data on the one or more other subframes.

Optionally, the processor 61 executing the computer code is further configured to:

instruct the UE to obtain a logical channel identifier LCID carried in a Media Access Control protocol data unit MAC PDU in a packet, so as to determine, according to a correspondence between the LCID and a session, a session corresponding to the packet.

Optionally, the LCID is an LCID used when the base station sends the group service data by using the MBSFN subframe.

Optionally, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

Optionally, the processor 61 is configured to execute the computer code to send a radio network temporary identifier RNTI used to identify the MCH to the UE, and specifically configured to:

allocate a corresponding RNTI to the MCH, and send the allocated RNTI in a system information block SIB to the UE.

Optionally, the processor 61 is configured to execute the computer code to send a radio network temporary identifier RNTI used to identify the MCH to the UE, and specifically configured to:

send, by using a multicast control channel MCCH, an RNTI that is of the MCH and that is determined by a multicast coordination entity MCE to the UE.

Optionally, the processor 61 executing the computer code is further configured to:

if the RNTI that is of the MCH and that is determined by the MCE is allocated by the base station to any UE accessing the base station and used as a cell radio network temporary identifier C-RNTI of the any UE, replace the RNTI with a new RNTI for the any UE as the C-RNTI of the any UE.

Optionally, the instruction information is a preset value of a stop identifier field in the MSI, and the preset value includes a reserve value.

It should be noted that the processor 61 herein may be one processor or may be a collective term of multiple processing elements. For example, the processor may be a central processing unit (CPU), or may be an application-specific integrated circuit (ASIC), or be configured as one or more integrated circuits that implement the embodiments of the present invention, such as, one or more digital signal processors (DSP), or one or more field programmable gate arrays (FPGA).

The memory 62 may be one storage apparatus or may be a collective term of multiple storage elements, and is configured to store executable program code or a parameter, data, and the like that are required for running an access network management device. In addition, the memory 62 may include a random access memory (RAM), and may further include a non-volatile memory, such as a disk memory or a flash.

The bus 64 may be an Industry Standard Architecture (ISA) bus, a Peripheral Component Interconnect (PCI) bus, or an Extended Industry Standard Architecture (EISA) bus, or the like. The bus 64 may be categorized into an address bus, a data bus, a control bus, and the like. For convenience of indication, the bus is represented by using only one thick line in FIG. 11; however, it does not indicate that there is only one bus or only one type of buses.

According to the base station provided in this embodiment of the present invention, a base station sends group service data to UE within one MSP on an MBSFN subframe corresponding to an MCH. When the base station cannot completely send the group service data on the MBSFN subframe that is corresponding to the MCH and that is within the MSP, the base station sends, on one or more other subframes except the MBSFN subframe corresponding to the MCH, remaining group service data that cannot be sent on the MBSFN subframe corresponding to the MCH. The base station instructs the UE to receive the remaining data on the one or more other subframes. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the UE, so that radio resources may be efficiently utilized.

Figure 12:
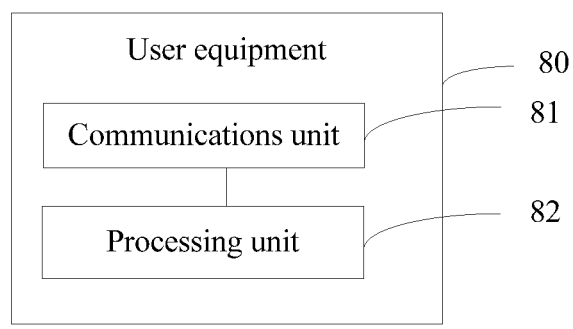
FIG. 12 is a schematic structural diagram of user equipment according to an embodiment of the present invention.

An embodiment of the present invention provides user equipment 80. As shown in FIG. 12, the user equipment 80 includes a communications unit 81 and a processing unit 82.

The communications unit 81 is configured to communicate with a base station.

The processing unit 82 is configured to: when group service data sent, by the base station, on a multimedia broadcast multicast service single frequency network MBSFN subframe corresponding to a multicast channel MCH is received by using the communications unit 81, receive, by using the communications unit 81, instruction information sent by the base station, where the instruction information is used to instruct the user equipment to receive, on one or more other subframes except the MBSFN subframe corresponding to the MCH, remaining group service data that cannot be sent on the MBSFN subframe corresponding to the MCH; and receive the remaining data on the one or more other subframes according to the instruction information and by using the communications unit 81.

Optionally, the processing unit 82 is further configured to:

receive, by using the communications unit 81, scheduling information that includes the instruction information and that is sent by the base station.

Optionally, the scheduling information includes: multicast channel scheduling information MSI or a Media Access Control-control element MAC-CE.

Optionally, the processing unit 82 is further configured to:

receive, by using the communications unit 81, time instruction information sent by the base station, where the time instruction information is used to instruct the user equipment to receive, according to the instruction information, the remaining data within a preset time period.

Optionally, the processing unit 82 is further configured to:

receive, by using the communications unit 81, a radio network temporary identifier RNTI that is used to identify the MCH and that is sent by the base station.

The instruction information is used to instruct the user equipment to receive, according to the received RNTI, the remaining data on the one or more other subframes.

Optionally, the processing unit 82 is further configured to:

obtain a logical channel identifier LCID carried in a Media Access Control protocol data unit MAC PDU in a packet, so as to determine, according to a correspondence between the LCID and a session, a session corresponding to the packet.

Optionally, the LCID is an LCID used when the base station sends the group service data by using the MBSFN subframe.

Optionally, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

Optionally, the processing unit 82 is further configured to:

receive, by using the communications unit 81, a system information block SIB sent by the base station, where the SIB includes a corresponding RNTI allocated to the MCH by the base station.

Optionally, the processing unit 82 is further configured to:

receive, by using the communications unit 81 and by using a multicast control channel MCCH, an RNTI, of the MCH, that is determined by a multicast coordination entity MCE and that is sent by the base station.

Optionally, the processing unit 82 is further configured to:

if the RNTI that is of the MCH and that is determined by the MCE is used as a cell radio network temporary identifier C-RNTI by the user equipment, receive a new RNTI sent by the base station and use the new RNTI as the C-RNTI.

Optionally, the instruction information is a preset value of a stop identifier field in the MSI, and the preset value includes a reserve value.

It should be noted that the communications unit 81 in this embodiment may be a transceiver, a transceiver circuit, or the like of the user equipment. The processing unit 82 may be a standalone processor, or may be integrated into a processor of the base station for implementation, and in addition, may also be stored in a memory of the base station in a form of program code, and functions of the foregoing processing unit are invoked and executed by a processor of the user equipment. The processor described herein may be a central processing unit (CPU), or an application-specific integrated circuit (ASIC), or one or more integrated circuits configured to implement this embodiment of the present invention.

According to the user equipment provided in this embodiment of the present invention, when user equipment receives group service data sent by a base station on an MBSFN subframe corresponding to an MCH, the user equipment receives instruction information sent by the base station. The instruction information is used to instruct the user equipment to receive, on one or more other subframes except the MBSFN subframe corresponding to the MCH, remaining group service data that cannot be sent on the MBSFN subframe corresponding to the MCH. The user equipment receives the remaining data on the one or more other subframes according to the instruction information. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the user equipment, so that radio resources may be efficiently utilized.

Figure 13:
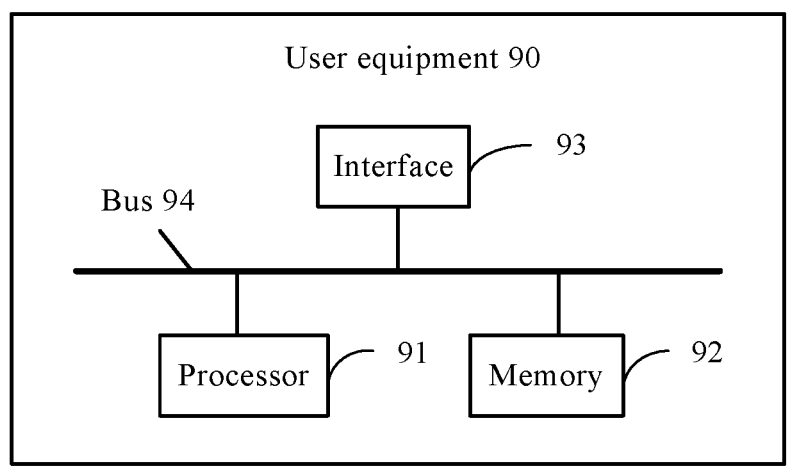
FIG. 13 is a schematic structural diagram of other user equipment according to an embodiment of the present invention.

An embodiment of the present invention further provides user equipment 90. As shown in FIG. 13, the user equipment 90 includes: a bus 94; and a processor 91, a memory 92, and an interface 93 that are connected to the bus 94, where the interface 93 is configured to perform communication, the memory 92 is configured to store computer code, and the processor 91 is configured to execute the computer code to:

when group service data sent, by a base station, on a multimedia broadcast multicast service single frequency network MBSFN subframe corresponding to a multicast channel MCH is received, receive instruction information sent by the base station, where the instruction information is used to instruct the user equipment to receive, on one or more other subframes except the MBSFN subframe corresponding to the MCH, remaining group service data that cannot be sent on the MBSFN subframe corresponding to the MCH; and receive the remaining data on the one or more other subframes according to the instruction information.

Optionally, the processor 91 is configured to execute the computer code to receive instruction information sent by the base station, and specifically configured to:

receive scheduling information that includes the instruction information and that is sent by the base station.

Optionally, the scheduling information includes: multicast channel scheduling information MSI or a Media Access Control-control element MAC-CE.

Optionally, the processor 91 executing the computer code is further configured to:

receive time instruction information sent by the base station, where the time instruction information is used to instruct the user equipment to receive, according to the instruction information, the remaining data within a preset time period.

Optionally, the processor 91 executing the computer code is further configured to:

receive a radio network temporary identifier RNTI that is used to identify the MCH and that is sent by the base station.

The instruction information is used to instruct the user equipment to receive, according to the received RNTI, the remaining data on the one or more other subframes.

Optionally, the processor 91 executing the computer code is further configured to:

obtain a logical channel identifier LCID carried in a Media Access Control protocol data unit MAC PDU in a packet, so as to determine, according to a correspondence between the LCID and a session, a session corresponding to the packet.

Optionally, the LCID is an LCID used when the base station sends the group service data by using the MBSFN subframe.

Optionally, the one or more other subframes include:

a unicast subframe within the MSP and behind a subframe corresponding to multicast channel scheduling information MSI; or M unicast subframes after the MSP ends, where M is a positive integer; or N MBSFN subframes that are used by another MCH other than the MCH in the same MBSFN area and that are behind the subframe corresponding to the MSI, where N is a positive integer.

Optionally, the processor 91 is configured to execute the computer code to receive a radio network temporary identifier RNTI that is used to identify the MCH and that is sent by the base station, and specifically configured to:

receive a system information block SIB sent by the base station, where the SIB includes a corresponding RNTI allocated to the MCH by the base station.

Optionally, the processor 91 is configured to execute the computer code to receive a radio network temporary identifier RNTI that is used to identify the MCH and that is sent by the base station, and specifically configured to:

receive, by using a multicast control channel MCCH, an RNTI, of the MCH, that is determined by a multicast coordination entity MCE and that is sent by the base station.

Optionally, the processor 91 executing the computer code is further configured to:

if the RNTI that is of the MCH and that is determined by the MCE is used as a cell radio network temporary identifier C-RNTI by the user equipment, receive a new RNTI sent by the base station and use the new RNTI as the C-RNTI.

Optionally, the instruction information is a preset value of a stop identifier field in the MSI, and the preset value includes a reserve value.

It should be noted that the processor 91 herein may be one processor or may be a collective term of multiple processing elements. For example, the processor may be a central processing unit (CPU), or may be an application-specific integrated circuit (ASIC), or be configured as one or more integrated circuits that implement the embodiments of the present invention, such as, one or more digital signal processors (DSP), or one or more field programmable gate arrays (FPGA).

The memory 92 may be one storage apparatus or may be a collective term of multiple storage elements, and is configured to store executable program code or a parameter, data, and the like that are required for running an access network management device. In addition, the memory 92 may include a random access memory (RAM), and may further include a non-volatile memory, such as a disk memory or a flash.

The bus 94 may be an Industry Standard Architecture (ISA) bus, a Peripheral Component Interconnect (PCI) bus, or an Extended Industry Standard Architecture (EISA) bus, or the like. The bus 94 may be categorized into an address bus, a data bus, a control bus, and the like. For convenience of indication, the bus is represented by using only one thick line in FIG. 13; however, it does not indicate that there is only one bus or only one type of buses.

According to the user equipment provided in this embodiment of the present invention, when user equipment receives group service data sent by a base station on an MBSFN subframe corresponding to an MCH, the user equipment receives instruction information sent by the base station. The instruction information is used to instruct the user equipment to receive, on one or more other subframes except the MBSFN subframe corresponding to the MCH, remaining group service data that cannot be sent on the MBSFN subframe corresponding to the MCH. The user equipment receives the remaining data on the one or more other subframes according to the instruction information. In this way, with no need to allocate a large quantity of MBSFN subframes to a group service, when a data burst occurs, the base station uses the one or more other subframes except the MBSFN subframe corresponding to the MCH that carries the group service to transmit a remaining packet to the user equipment, so that radio resources may be efficiently utilized.

The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or a part of the functions described above. For a detailed working process of the foregoing apparatus, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for transmitting multimedia broadcast multicast service (MBMS) group service data, comprising:
sending, by a base station, group service data to a user equipment (UE) within one multicast channel scheduling period (MSP) on a multimedia broadcast multicast service single frequency network (MBSFN) subframe corresponding to a multicast channel (MCH);
when the base station cannot completely send the group service data on the MBSFN subframe that is corresponding to the MCH and that is within the MSP, sending, by the base station, on one or more other subframes except the MBSFN subframe corresponding to the MCH, remaining group service data that cannot be sent on the MBSFN subframe corresponding to the MCH; and
instructing, by the base station, the UE to receive the remaining data on the one or more other subframes, wherein the one or more other subframes comprise:
a unicast subframe within the MSP and behind a subframe corresponding to multicast channel scheduling information (MSI); or
M unicast subframes after the MSP ends, wherein M is a positive integer; or N MBSFN subframes that are used by another MCH other than the MCH in the same MBSFN area and that are behind the subframe corresponding to the MSI, wherein N is a positive integer.

2. The method according to claim 1, wherein the instructing, by the base station, the UE to receive the remaining data on the one or more other subframes comprises:

sending, by the base station, scheduling information that comprises instruction information to the UE, wherein the instruction information is used to instruct the UE to receive the remaining data on the one or more other subframes;

wherein the scheduling information comprises: multicast channel scheduling information (MSI) or a Media Access Control-control element (MAC-CE).

3. The method according to claim 2, wherein the instructing, by the base station, the UE to receive the remaining data on the one or more other subframes further comprises:

sending, by the base station, time instruction information to the UE, wherein the time instruction information is used to instruct the UE to receive, according to the instruction information, the remaining data within a preset time period.

4. The method according to claim 2, wherein the method further comprises: sending, by the base station, a radio network temporary identifier (RNTI) used to identify the MCH to the UE, wherein the instruction information is used to instruct the UE to receive, according to the received RNTI, the remaining data on the one or more other subframes.

5. A method for transmitting multimedia broadcast multicast service (MBMS) group service data, comprising:

when a user equipment (UE) receives group service data sent, by a base station, on a multimedia broadcast multicast service single frequency network (MBSFN) subframe corresponding to a multicast channel (MCH), receiving, by the UE, instruction information sent by the base station, wherein the instruction information is used to instruct the UE to receive, on one or more other subframes except the MBSFN subframe corresponding to the MCH, remaining group service data that cannot be sent on the MBSFN subframe corresponding to the MCH; and receiving, by the UE, the remaining data on the one or more other subframes according to the instruction information, wherein the one or more other subframes comprise:

a unicast subframe within the MSP and behind a subframe corresponding to multicast channel scheduling information (MSI); or M unicast subframes after the MSP ends, wherein M is a positive integer; or N MBSFN subframes that are used by another MCH other than the MCH in the same MBSFN area and that are behind the subframe corresponding to the MSI, wherein N is a positive integer.

6. The method according to claim 5, wherein the receiving, by the UE, instruction information sent by the base station comprises:

receiving, by the UE, scheduling information that comprises the instruction information and that is sent by the base station;

wherein the scheduling information comprises: multicast channel scheduling information (MSI) or a Media Access Control-control element (MAC-CE).

7. The method according to claim 5, wherein the method further comprises:

receiving, by the UE, time instruction information sent by the base station, wherein the time instruction information is used to instruct the UE to receive, according to the instruction information, the remaining data within a preset time period.

8. A base station, comprising:

a memory; and a processor coupled to the memory and configured to:

send group service data to the UE within one multicast channel scheduling period (MSP) on a multimedia broadcast multicast service single frequency network (MBSFN) subframe corresponding to a multicast channel (MCH);

when the group service data cannot be completely sent on the MBSFN subframe that is corresponding to the MCH and that is within the MSP, send, on one or more other subframes except the MBSFN subframe corresponding to the MCH, remaining group service data that cannot be sent on the MBSFN subframe corresponding to the MCH; and instruct the UE to receive the remaining data on the one or more other subframes, wherein the one or more other subframes comprise:

a unicast subframe within the MSP and behind a subframe corresponding to multicast channel scheduling information (MSI); or M unicast subframes after the MSP ends, wherein M is a positive integer; or N MBSFN subframes that are used by another MCH other than the MCH in the same MBSFN area and that are behind the subframe corresponding to the MSI, wherein N is a positive integer.

9. The base station according to claim 8, wherein the processor is further configured to:

send scheduling information that comprises instruction information to the UE, wherein the instruction information is used to instruct the UE to receive the remaining data on the one or more other subframes;

wherein the scheduling information comprises: multicast channel scheduling information (MSI) or a Media Access Control-control element (MAC-CE).

10. The base station according to claim 9, wherein the processor is further configured to:

send time instruction information to the UE, wherein the time instruction information is used to instruct the UE to receive, according to the instruction information, the remaining data within a preset time period.

11. The base station according to claim 9, wherein the processor is further configured to:

send a radio network temporary identifier RNTI used to identify the MCH to the UE, wherein the instruction information is used to instruct the UE to receive, according to the received RNTI, the remaining data on the one or more other subframes.

12. The base station according to claim 9, wherein the instruction information is a preset value of a stop identifier field in the MSI, and the preset value comprises a reserve value.

13. User equipment, comprising:

a memory; and a processor coupled to the memory and configured to:

when group service data sent, by a base station, on a multimedia broadcast multicast service single frequency network (MBSFN) subframe corresponding to a multicast channel (MCH) is received, receive instruction information sent by the base station, wherein the instruction information is used to instruct the user equipment to receive, on one or more other subframes except the MBSFN subframe corresponding to the MCH, remaining group service data that cannot be sent on the MBSFN subframe corresponding to the MCH; and receive the remaining data on the one or more other subframes according to the instruction information, wherein the one or more other subframes comprise:

a unicast subframe within the MSP and behind a subframe corresponding to multicast channel scheduling information (MSI); or M unicast subframes after the MSP ends, wherein M is a positive integer; or N MBSFN subframes that are used by another MCH other than the MCH in the same MBSFN area and that are behind the subframe corresponding to the MSI, wherein N is a positive integer.

14. The user equipment according to claim 13, wherein the processor is further configured to:

receive scheduling information that comprises the instruction information and that is sent by the base station;

wherein the scheduling information comprises: multicast channel scheduling information (MSI) or a Media Access Control-control element (MAC-CE).

15. The user equipment according to claim 13, wherein the processor is further configured to:

receive time instruction information sent by the base station, wherein the time instruction information is used to instruct the user equipment to receive, according to the instruction information, the remaining data within a preset time period.

16. The user equipment according to claim 13, wherein the processor is further configured to:

receive a radio network temporary identifier (RNTI) that is used to identify the MCH and that is sent by the base station, wherein the instruction information is used to instruct the user equipment to receive, according to the received RNTI, the remaining data on the one or more other subframes.

17. The user equipment according to claim 14, wherein the instruction information is a preset value of a stop identifier field in the MSI, and the preset value comprises a reserve value.

* * * * *